United States Patent
Soukharev

(10) Patent No.: US 10,673,631 B2
(45) Date of Patent: Jun. 2, 2020

(54) ELLIPTIC CURVE ISOGENY-BASED CRYPTOGRAPHIC SCHEME

(71) Applicant: INFOSEC GLOBAL INC., Toronto (CA)

(72) Inventor: Vladimir Soukharev, Toronto (CA)

(73) Assignee: InfoSec Global Inc., Toronto (CA)

( * ) Notice: Subject to any disclaimer, the term of this patent is extended or adjusted under 35 U.S.C. 154(b) by 239 days.

(21) Appl. No.: 15/800,813

(22) Filed: Nov. 1, 2017

(65) Prior Publication Data

US 2018/0323973 A1 Nov. 8, 2018

Related U.S. Application Data

(60) Provisional application No. 62/418,357, filed on Nov. 7, 2016.

(51) Int. Cl.
*H04L 9/08* (2006.01)
*H04L 9/30* (2006.01)
*G06F 7/72* (2006.01)

(52) U.S. Cl.
CPC .......... *H04L 9/3066* (2013.01); *G06F 7/725* (2013.01); *H04L 9/0825* (2013.01)

(58) Field of Classification Search
CPC ... H04L 9/0825; H04L 9/0838; H04L 9/0841; H04L 9/0861; H04L 9/14; H04L 9/30; H04L 9/3066; H04L 63/045
See application file for complete search history.

(56) References Cited

U.S. PATENT DOCUMENTS

| 7,079,650 B1 * | 7/2006 | Knudsen | G06F 7/725 380/28 |
| 9,767,318 B1 * | 9/2017 | Dropps | G06F 21/72 |
| 2005/0094806 A1 * | 5/2005 | Jao | G06F 7/725 380/30 |

(Continued)

OTHER PUBLICATIONS

Wikipedia, "Supersingular isogeny key exchange" [Online], Apr. 23, 2016 [Retrieved: Jan. 21, 2020], Internet Archive Wayback Machine, Retrieved from: < https://web.archive.org/web/20160423151140/https://en.wikipedia.org/wiki/Supersingular_isogeny_key_exchange > (Year: 2016).*

(Continued)

*Primary Examiner* — Eric W Shepperd
(74) *Attorney, Agent, or Firm* — Bhole IP Law; Anil Bhole; Marc Lampert

(57) ABSTRACT

Elliptic curve cryptographic schemes performed between a pair of cryptographic correspondent computing devices. In an aspect, a first entity generates a first basis point in a first selected basis being, either a first basis (A) or a second basis (B), and performs a first key generation in the selected basis. A second entity receives the public key and determines the product of a predetermined scalar in a second selected basis being either the first basis (A) or the second basis (B) and one of the first auxiliary points. If the product is an identity point, performs second key generation in the second selected basis, otherwise performing second key generation in either of the first basis (A) or the second basis (B). A common key is generated using the private keys and public keys. In another aspect, a scheme is performed symmetrically between two entities to generate a common key.

14 Claims, 5 Drawing Sheets

(56) References Cited

U.S. PATENT DOCUMENTS

| | | | | |
|---|---|---|---|---|
| 2006/0206554 | A1* | 9/2006 | Lauter | G06F 7/725 708/492 |
| 2007/0055880 | A1* | 3/2007 | Lauter | H04L 9/0844 713/171 |
| 2007/0098150 | A1* | 5/2007 | Lauter | H04L 9/0643 380/28 |
| 2007/0165846 | A1* | 7/2007 | Lauter | G06F 7/582 380/46 |
| 2007/0180012 | A1* | 8/2007 | Lauter | G06F 17/18 708/445 |
| 2008/0273694 | A1* | 11/2008 | Ebeid | G06F 7/725 380/28 |
| 2010/0232601 | A1* | 9/2010 | Itoh | G06F 7/725 380/28 |
| 2011/0268269 | A1* | 11/2011 | Spalka | H04L 9/0643 380/44 |
| 2013/0287209 | A1* | 10/2013 | Itoh | H04L 9/003 380/44 |
| 2015/0333906 | A1* | 11/2015 | Rahman | H04L 9/0841 380/44 |
| 2015/0339102 | A1* | 11/2015 | Feix | G06F 7/725 380/30 |
| 2017/0091148 | A1* | 3/2017 | Takahashi | G09C 1/00 |

OTHER PUBLICATIONS

Feo et al., "Towards Quantum-Resistant Cryptosystems From Supersingular Elliptic Curve Isogenies" [Online], 2011 [Retrieved on: Jan. 23, 2020], Cryptology ePrint Archive, Retrieved from: < https://eprint.iacr.org/2011/506.pdf > (Year: 2011).*

Costello et al., "Efficient algorithms for supersingular isogeny Diffie-Hellman" [Online], Jun. 20, 2016 [Retrieved on: Jan. 23, 2020], Cryptology ePrint Archive, Retrieved from: < https://eprint.iacr.org/eprint-bin/getfile.pl?entry=2016/413&version=20160620:054759&file=413.pdf > (Year: 2016).*

Broker, Reiner, "Constructing Supersingular elliptic curves" [Online], 2000 [Retrieved: Jan. 23, 2020], 2000 Mathematics Subject Classification, Retrieved from: < http://citeseerx.ist.psu.edu/viewdoc/download?doi=10.1.1.304.7992&rep=rep1&type=pdf > (Year: 2000).*

Biasse et al., "A quantum algorithm for computing isogenies between supersingular elliptic curves" [Online], Oct. 25, 2014 [Retrieved on: Jan. 23, 2020], University of Waterloo, Retrieved from: < http://cacr.uwaterloo.ca/techreports/2014/cacr2014-24.pdf > (Year: 2014).*

* cited by examiner

ELLIPTIC CURVE ISOGENY-BASED CRYPTOGRAPHIC SCHEME

TECHNICAL FIELD

The following relates to data communication systems and schemes utilized in such systems; and more specifically, to isogeny-based elliptic curve cryptographic schemes.

BACKGROUND

Data communication systems are used to exchange information between devices. The information to be exchanged comprises data that is organized as strings of digital bits formatted so as to be recognizable by other devices and to permit the information to be processed and/or recovered.

The exchange of information may occur over a publically accessible network, such as a communication link between two devices, over a dedicated network within an organization, or may be between two devices within the same dedicated component, such as within a computer or point of sale device.

The devices may range from relatively large computer systems through to telecommunication devices, cellular phones, monitoring devices, sensors, electronic wallets and smart cards, and a wide variety of devices that are connected to transfer data between two or more of such devices.

A large number of communication protocols have been developed to allow the exchange of data between different devices. The communication protocols permit the exchange of data in a robust manner, often with error correction and error detection functionality, and for the data to be directed to the intended recipient and recovered for further use.

Because the data may be accessible to other devices, it is vulnerable to interception and observation or manipulation. The sensitive nature of the information requires that steps are taken to secure the information and ensure its integrity.

A number of techniques collectively referred to as cryptographic encryption protocols, key agreement protocols, and authentication protocols have been developed to provide the required attributes and ensure security and/or integrity in the exchange of information. These techniques utilize a key that is combined with the data. An extensive survey of cryptography techniques is provided in Menezes, van Oorshot and Vanstone's Handbook of Applied Cryptography, the contents of which are incorporated by reference.

There are two main types of cryptosystems, symmetric key cryptosystems and asymmetric or public key cryptosystems. In a symmetric key cryptosystem, the devices exchanging information share a common key that is known only to the devices intended to share the information. Symmetric key systems have the advantage that they are relatively fast and therefore able to process large quantities of data in a relatively short time, even with limited computing power. However, the keys must be distributed in a secure manner to the different devices, which leads to increased overhead and vulnerability if the key is compromised.

Asymmetric or public key cryptosystems utilize a key pair, one of which is public and the other private, associated with each device. The public key and private key are related by a "hard" mathematical problem so that even if the public key and the underlying problem are known, the private key cannot be recovered in a feasible time. One such problem is the factoring of the product of two large primes, as utilized in RSA cryptosystems. Another is the discrete log problem in a finite group. A generator, $\alpha$, of the underlying group is identified as a system parameter and a random integer, k, generated for use as a private key. To obtain a public key, K, a k-fold group operation is performed so that $K=f(\alpha,k)$.

Different groups may be used in discrete log cryptosystems including the multiplicative group of a finite field, the group of integers in a finite cyclic group of order p, usually denoted Zp* and consisting of the integers 0 to p-1. The group operation is generally an operation such that $\alpha^k=f(\alpha, k)$.

Another group that is used for enhanced security is an elliptic curve group. The elliptic curve group consists of elements, represented by pairs of field elements, one of which is designated x and the other y, that satisfy the equation of the chosen elliptic curve. For an elliptic curve group over field of size p, the elliptic curve would generally be defined by the relationship $y^2 \mod p = x^3+ax+b \mod p$. Other curves are used for different groups, as is well known. Each such pair of elements is a point on the curve. P is an element on the elliptic curve group of a large order. The group operation is addition, so a private key k will have a corresponding public key $kP=f(\alpha,k)$.

Public key cryptosystems reduce the infrastructure necessary with symmetric key cryptosystems. A device may generate an integer k, and generate the corresponding public key kP. The public key is published so it is available to other devices. The device may then use a suitable signature protocol to sign a message using the private key k and other devices can confirm the integrity of the message using the public key kP.

Similarly, a device may encrypt a message to be sent to another device using the other devices public key. The message can then be recovered by the other device using the private key. However, these protocols are computationally intensive, and therefore relatively slow, compared with symmetric cryptosystem protocols.

Public key cryptosystems may also be used to establish a key that is shared between two devices. In its simplest form, as proposed by Diffie-Hellman, each device sends a public key to the other device. Both devices then combine the received public key with their private key to obtain a shared key.

One device, usually referred to as an entity (or correspondent), Alice, generates a private key $k_a$ and sends another device, or entity, Bob, the public key $k_aP$.

Bob generates a private key $k_b$ and sends Alice the public key $k_bP$

Alice computes $k_a \cdot k_bP$ and Bob computes $k_b \cdot k_aP$ so they share a common key $K=k_ak_bP=k_bk_aP$. The shared key may then be used in a symmetric key protocol. Neither Alice nor Bob may recover the private key of the other, and third parties cannot reconstruct the shared key.

However, in the foreseeable future, conventional cryptography schemes may be compromised due to the emergence of quantum computing. Many practitioners skilled in the art believe that in less than a handful of decades, quantum computing will have widespread use. The emergence of quantum computers provides an evolutionary leap in computation power. However, adversaries or interlopers looking to intercept the encrypted communication may also gain access to the power of quantum computing to break encryption and gain access to supposedly secured communications. One of the important abilities of quantum computers is to efficiently, which means in polynomial time, factor large integers and solve the discrete logarithm problem (for example, given g and $h=g^x$ in group G, find x). A significant factor affecting cryptography's security is based on these two mathematical problems, which are considered to be safe in the realm of classical computing. This means that with the appearance of quantum computers, classical cryptosystems may no longer be safe. The field of 'post-quantum cryptography' is involved in developing cryptosystems for classical computers so that the classical computer systems would be quantum-resistant and secure against possible adversaries employing quantum computing.

With respect to key agreement protocols for existing post-quantum cryptographic schemes, including elliptic curve cryptography, the key agreements have usability issues due to the manner in which they are required to be used.

It is therefore an object of the present invention to provide a cryptographic scheme in which the above disadvantages are obviated or mitigated and attainment of the desirable attributes is facilitated.

SUMMARY

In an aspect, there is provided an elliptic curve cryptographic scheme performed between a first entity on a first computing device and a second entity on a second computing device communicating over a data communication system, the cryptographic scheme comprising: performing, by the first entity: selecting a first selected basis being either a first basis or a second basis; performing first key generation with respect to the first selected basis to generate a first private key and a first public key; and communicating the first public key to the second entity; performing, by the second entity: determining if a linear combination, in a second selected basis being either the first basis or the second basis, is an identity point; performing second key generation with respect to the first basis if the scalar multiplication product is the identity point, otherwise performing second key generation with respect to the second basis, the second key generation generating a second private key and a second public key; and communicating a second public key to the second entity; performing, by the first entity: generating a common key by combining the first private key and the second public key; and performing, by the second entity: generating a common key by combining the second private key and the first public key.

In a particular case, first key generation comprises: generating a first private key; and generating a cryptographic corresponding first public key comprising a first elliptic curve and first auxiliary points; and wherein second key generation comprises: generating a second private key; and generating a cryptographic corresponding second public key comprising a second elliptic curve and second auxiliary points.

In another case, determining the linear combination comprises determining a scalar multiplication product of a predetermined scalar in the second selected basis and one of the first auxiliary points.

In yet another case, determining the linear combination comprises determining a scalar multiplication product of a predetermined scalar in the first selected basis and one of the first auxiliary points.

In yet another case, determining the linear combination comprises determining a scalar multiplication product of a predetermined scalar in the first selected basis, a predetermined scalar in the second selected basis, and one of the first auxiliary points.

In yet another case, the scheme further comprising determining whether the values of the first public key are in the right domain by determining that such values are in defined torsion subgroups.

In yet another case, determining the linear combination comprises determining a sum of a first private scalar multiplied by the first auxiliary point and a second private scalar multiplied by the second auxiliary point.

In another aspect, there is provided a cryptographic correspondent device comprising a processor and a memory, the cryptographic correspondent device in communication with an other cryptographic correspondent device over a data communication system, the memory having stored thereon computer instructions which when executed by the processor cause the processor to implement a elliptic curve cryptographic scheme comprising: receiving, from the other cryptographic correspondent device, a first public key, the other cryptographic correspondent device having selected a first selected basis being either a first basis or a second basis, and the other cryptographic correspondent device having performed first key generation with respect to the first selected basis to generate a first private key and the first public key; determining if a linear combination, in a second selected basis being either the first basis or the second basis, is an identity point; performing second key generation with respect to the first basis if the scalar multiplication product is the identity point, otherwise performing second key generation with respect to the second basis, the second key generation generating a second private key and a second public key; communicating the second public key to the other cryptographic correspondent device; and generating a common key by combining the second private key and the first public key.

In a particular case, first key generation comprises: generating a first private key; and generating a cryptographic corresponding first public key comprising a first elliptic curve and first auxiliary points; and wherein second key generation comprises: generating a second private key; and generating a cryptographic corresponding second public key comprising a second elliptic curve and second auxiliary points.

In another case, determining the linear combination comprises determining a scalar multiplication product of a predetermined scalar in the second selected basis and one of the first auxiliary points.

In yet another case, determining the linear combination comprises determining a scalar multiplication product of a predetermined scalar in the first selected basis and one of the first auxiliary points.

In yet another case, determining the linear combination comprises determining a scalar multiplication product of a predetermined scalar in the first selected basis, a predetermined scalar in the second selected basis, and one of the first auxiliary points.

In yet another case, the scheme executed by the device further comprising determining whether the values of the first public key are in the right domain by determining that such values are in defined torsion subgroups.

In yet another case, determining the linear combination comprises determining a sum of a first private scalar multiplied by the first auxiliary point and a second private scalar multiplied by the second auxiliary point.

In yet another aspect, there is provided an elliptic curve cryptographic scheme performed between a pair of entities on computing devices communicating over a data communication system, the cryptographic scheme comprising: selecting, randomly, first private scalars in a first basis and second private scalars in a second basis; determining a first kernel in the first basis using the first private scalars and a second kernel in the second basis using the second private scalars; determining a first elliptic curve using the first kernel and a second elliptic curve using the second kernel; determining first auxiliary points based on a first isogeny of the first elliptic curve and second auxiliary points based on a second isogeny of the second elliptic curve; generating a private key comprising the first private scalars and the second private scalars; generating a public key comprising the first elliptic curve, the second elliptic curve, the first auxiliary points and the second auxiliary points; making available the public key to the other entity; receiving, from the other entity, an acquired public key, the acquired public key comprising a first-acquired elliptic curve, a second-acquired elliptic curve, first-acquired auxiliary points and second-acquired auxiliary points; and generating a common key, comprising: determining a first-consequent kernel using the first private scalars and the second-acquired auxiliary points; computing a second-consequent kernel using the second private scalars and the first-acquired auxiliary points; mapping a first-consequent elliptic curve from the first-acquired elliptic curve using the first-consequent kernel; mapping a second-consequent elliptic curve from the second-acquired elliptic curve using the second-consequent kernel; and determining the common key as the j-invariants of the first-consequent elliptic curve and the second-consequent elliptic curve.

In a particular case, the common key is static.

In another case, generating a common key further comprises determining a domain of each of the first-acquired auxiliary points and the second-acquired auxiliary points.

In yet another aspect, there is provided a cryptographic correspondent device comprising a processor and a memory, the cryptographic correspondent device in communication with an other cryptographic correspondent device over a data communication system, the memory having stored thereon computer instructions which when executed by the processor cause the processor to implement a elliptic curve cryptographic scheme comprising: selecting, randomly, first private scalars in a first basis and second private scalars in a second basis; determining a first kernel in the first basis using the first private scalars and a second kernel in the second basis using the second private scalars; determining a first elliptic curve using the first kernel and a second elliptic curve using the second kernel; determining first auxiliary points based on a first isogeny of the first elliptic curve and second auxiliary points based on a second isogeny of the second elliptic curve; generating a private key comprising the first private scalars and the second private scalars; generating a public key comprising the first elliptic curve, the second elliptic curve, the first auxiliary points and the second auxiliary points; making available the public key to the other entity; receiving, from the other cryptographic correspondent device, an acquired public key, the acquired public key comprising a first-acquired elliptic curve, a second-acquired elliptic curve, first-acquired auxiliary points and second-acquired auxiliary points; and generating a common key, comprising: determining a first-consequent kernel using the first private scalars and the second-acquired auxiliary points; computing a second-consequent kernel using the second private scalars and the first-acquired auxiliary points; mapping a first-consequent elliptic curve from the first-acquired elliptic curve using the first-consequent kernel; mapping a second-consequent elliptic curve from the second-acquired elliptic curve using the second-consequent kernel; and determining the common key as the j-invariants of the first-consequent elliptic curve and the second-consequent elliptic curve.

In a particular case, the common key is static.

In another case, generating a common key further comprises determining a domain of each of the first-acquired auxiliary points and the second-acquired auxiliary points.

These and other embodiments are contemplated and described herein. It will be appreciated that the foregoing summary sets out representative aspects of systems and methods to assist skilled readers in understanding the following detailed description.

DESCRIPTION OF THE DRAWINGS

An embodiment of the present invention will now be described by way of example only with reference to the accompanying drawings, in which.

DETAILED DESCRIPTION

Figure 1:
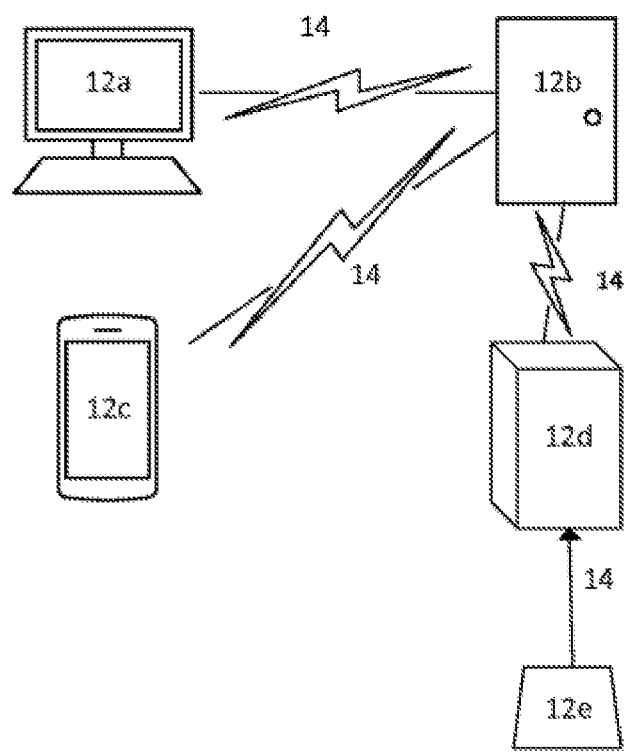
FIG. 1 is a schematic representation of a data communication system.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, computing device, mechanism, terminal or other device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media and executed by the one or more processors.

Elliptic curves have proven themselves over time as reliable mathematical tools and primitives for use in cryptography, and have become an object not only of profound theoretical interest but of sound practical interest as well. Isogenies are a useful aspect of elliptic curves to be used in elliptic curve-based cryptography. An isogeny between a pair of elliptic curves is an algebraic morphism that maps an identity point of the first curve to an identity point of the second curve and preserves the structure. In the field of post-quantum cryptography, elliptic curve-based schemes are often referred to as isogeny-based schemes, meaning elliptic curve isogenies. The term 'scheme', as generally used herein, is to be understood as a term of art that generally encompasses, for example, protocols, algorithms, and non-cryptographic techniques.

Isogeny-based schemes are recognized as valuable against attacks from adversaries with quantum computers because given two isogenous supersingular elliptic curves, finding an isogeny between them is generally intractable even for a quantum computer. The endomorphism ring for the elliptic curve is non-commutative, and as such, this problem becomes intractable for the quantum computer.

An isogeny between two elliptic curves (groups) E and E' is a group homomorphism, i.e. a function that preserves structural properties of the groups. Given two elliptic curves E and E' over the same finite field, it is easy to check if they are isogenous; namely they are isogenous if and only if they have the same size. Generally, the elliptic curve groups have the same size if they have the same cardinality. Nevertheless, finding the isogeny that maps between them is a difficult problem.

Elliptic curves can be of two types: ordinary and supersingular. For the traditional discrete logarithm problem, ordinary curves are typically believed to be more secure, as supersingular curves are vulnerable to attacks, such as an MOV attack. However, it is generally known that the discrete logarithm problem can be efficiently, meaning in polynomial time, solved using a quantum computer; this makes discrete logarithm-based cryptographic schemes insecure against quantum attacks, regardless of the underlying group.

In contrast, supersingular isogeny-based schemes can be secure against quantum attacks due to what is known as the "hard problem": given two isogenous elliptic curves, find an isogeny between them.

The approach to solving the isogeny problem between ordinary curves is as follows. It is known that there is a one-to-one correspondence between isogenies and ideals of the endomorphism ring of E denoted End(E). Also, End(E) and End(E) are isomorphic. Combined, this means that there is a one-to-one correspondence between isogenies between E and E', and ideals of the endomorphism ring. Hence, it is more convenient and in fact more efficient to work with elements of End(E), rather than directly with isogenies. Considering the ordinary case, End(E) is a commutative structure, meaning that a·b=b·a. Further mathematical manipulations for the corresponding ideal class group Cl(End(E)) may be done to reduce this problem to a problem that can be solved by a quantum computer in subexponential running time. Thus, ordinary elliptic curve isogeny may not be a good candidate for quantum-resistant schemes.

In contrast to ordinary curves, supersingular elliptic curves have the property that End(E) is a non-commutative structure. It does not even yield any group structure if one tries to obtain a corresponding ideal class group. The nature of quantum computer capabilities makes them in general unable to effectively solve problems in non-commutative structures. The fast algorithms of quantum computers cannot be applied in the case of supersingular elliptic curve schemes as there is no commutativity in there. Generally, the fastest attack using quantum computer is a fully exponential attack with 6th root complexity in the size of the input.

Turning to FIG. 1, an embodiment of a data communication system 10 is shown. The data communication system 10 includes a plurality of devices 12 interconnected by communication links 14. The devices 12 may be of any known type including a computer 12a, a server 12b, a cellphone 12c, ATM 12d, and smart card 12e. The communication links 14 may be conventional fixed telephone lines, wireless connections implemented between the devices 12, near field communication connections such as Bluetooth™ or other conventional forms of communication.

Figure 2:
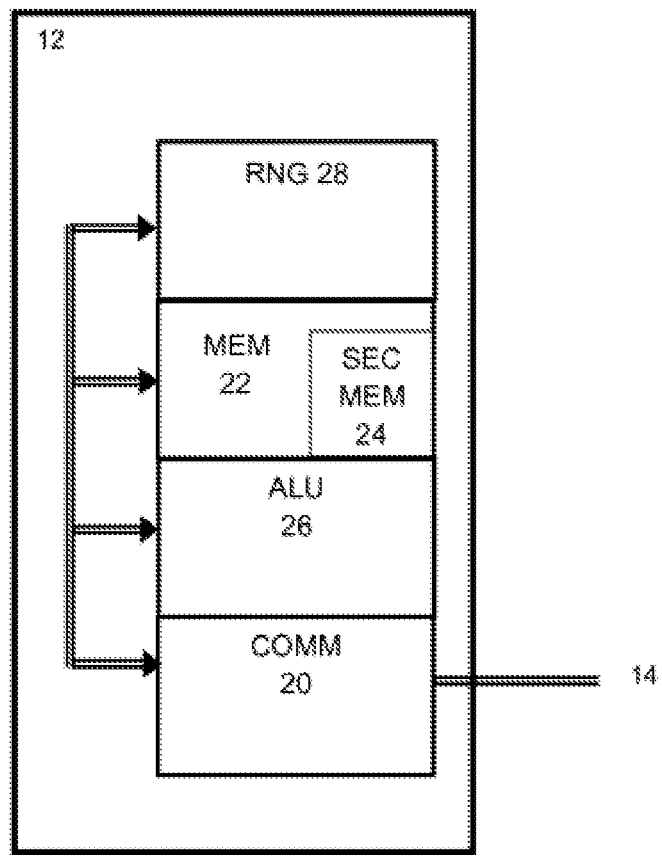
FIG. 2 is a representation of a device used in the data communication system of FIG. 1.

As shown in FIG. 2, the devices 12 will differ according to their intended purpose, but typically will include a communication module 20 for communication to the links 14. A memory 22 provides a storage medium for non-transient instructions to implement protocols and to store data as required. The instructions are executed by a cryptographic processor 30. A secure memory module 24, which may be part of memory 22 or may be a separate module, is used to store private information, such as the private keys used in the encryption protocols and withstand tampering with that data. An arithmetic logic unit (ALU) 26 is provided to perform the arithmetic operations instruction by the memory 22 using data stored in the memories 22, 24. A random or pseudo random number generator 28 is also incorporated to generate bit strings representing random numbers in a cryptographically secure manner.

It will be appreciated that the device 12 illustrated in FIG. 2, is highly schematic and representative of a conventional device used in a data communication system.

The memory 22 stores system parameters for the cryptosystem to be implemented and a set of computer readable instructions to implement the required protocol. In the case of an elliptic curve cryptosystem, elliptic curve domain parameters can include, for example:

the field size $p=1_A^{e_A} \cdot 1_B^{e_B} \cdot f \pm 1$;
the elliptic curve coefficients (a, b);
order values $1_A^{e_A}$ and $1_B^{e_B}$; and
bases points $\{P_A, Q_A\}$ of Basis 'A' (collectively called "Basis A") and $\{P_B, Q_B\}$ of Basis 'B' (collectively called "Basis B").

The parameters can be represented as bit strings, or any other suitable computer-readable representation.

Ephemeral values computed by the ALU may also be stored within the secure module 24 if their value is intended to be secret.

Figure 3:
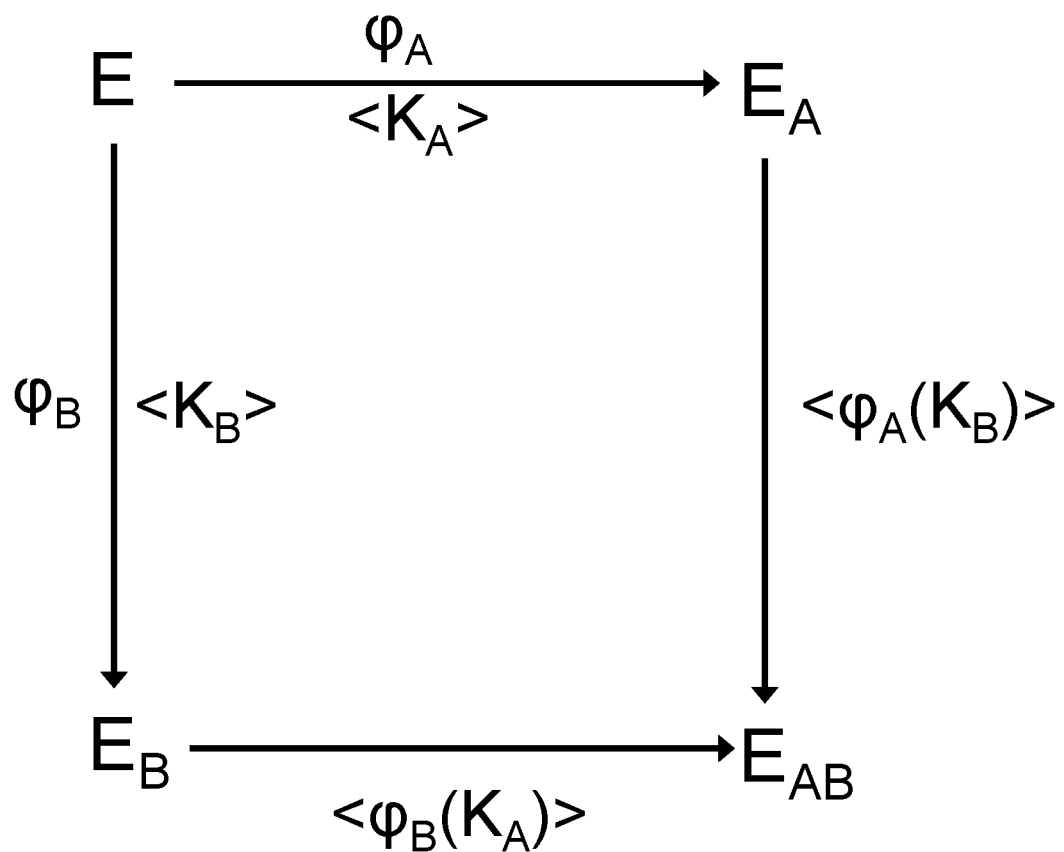
FIG. 3 is a chart showing facets of an isogeny-based elliptic curve cryptographic protocol.

An exemplary key agreement is shown in FIG. 3, performed between a pair of devices, a first entity called Alice ("A") on a first computing device and a second entity called Bob ("B") on a second computing device, communicating with each other over a data communication system. Values associated with Alice will be denoted by the suffix A and those of Bob by the suffix B.

Entities Alice and Bob want to share a common key, and therefore implement the instructions stored in the memory 22 being the cryptographic scheme shown in FIG. 3.

With reference to FIG. 3, the following is a supersingular elliptic curve cryptography scheme according to an embodiment.

E[m] is defined to be a set of points in the elliptic curve E so that the order of these points divides m. That is, if P ∈

E[m], then mP=∞(identity point). We construct our prime to be of the form $p=1_A^{e_A} \cdot 1_B^{e_B} \cdot f \pm 1$, where $1_A$ and $1_B$ are small primes and f is a cofactor.

Supersingular elliptic curves are defined over $F_{p^2}$. Where $F_{p^2}$ is the quadratic extension of field $F_p$. When m divides the order of the curve, the group structure of E[m] is isomorphic to $(Z_m)^2$, the two-dimensional space of integers mod m. Hence, two elliptic curve points to generate the entire E[m] are needed.

For the present purposes, $E[1_A^{e_A}]$ has generators $\{P_A, Q_A\}$ and $E[1_B^{e_B}]$ has generators $\{P_B, Q_B\}$. In the present case, two-prime constructions are used; however, in further cases, this approach can be extended beyond two-prime construction. In general, depending on the application, a construction with more primes can result in a slower system but with more functionality.

In general, a private key for entity A is represented by two scalar values $m_A, n_A \in Z_{1_A^{e_A}}$ (integers modulo $1_A^{e_A}$). These values are used to compute the elliptic curve point $K_A = m_A P_A + n_A Q_A$. The point $K_A$ is used as the generator of the kernel of the isogeny, denoted $\langle K_A \rangle$, to compute the corresponding isogeny $\varphi_A$. In practice, isogenies are not explicitly stated, but their kernels are used instead to compute them. Let $E_A$ be the resulting curve to which the isogeny $\varphi_A$ maps, that is $\varphi_A: E \to E_A$. $E_A$ thus becomes part of the public key corresponding to $m_A, n_A$. The second part of public key are values $\varphi_A(P_B)$ and $\varphi_A(Q_B)$, computed by Alice.

Given an isogeny $\varphi: E \to E'$ and a point $aP_1 + bP_2$, where $P_1, P_2 \in E$, we know that $\varphi(a \cdot P_1 + b \cdot P_2) = \varphi(a \cdot P_1) + \varphi(b \cdot P_2) = a \cdot \varphi(P_1) + b \cdot \varphi(P_2) \in E'$.

For the key exchange scheme, the actions of the two entities, Alice ("A") and Bob ("B"), are described below. The starting elliptic curve E is public as well as the bases' points $\{P_A, Q_A\}$ and $\{P_B, Q_B\}$.

For key generation, Alice does the following:
Randomly selects $m_A, n_A \in Z_{1_A^{e_A}}$.
Computes $K_A = m_A P_A + n_A Q_A$.
Obtains $E_A$ using the kernel $\langle K_A \rangle$ for corresponding isogeny $\varphi_A: E \to E_A$.
Computes the values of $P_B$ and $Q_B$ under her isogeny $\varphi_A$, namely $\varphi_A(P_B)$ and $\varphi_A(Q_B)$. These values are referred to as auxiliary points.
Publishes $E_A$ and auxiliary points $\varphi_A(P_B)$ and $\varphi_A(Q_B)$.
Bob does the same, symmetrically:
Randomly selects $m_B, n_B \in Z_{1_B^{e_B}}$.
Computes $K_B = m_B P_B + n_B Q_B$.
Obtains $E_B$ using the kernel $\langle K_B \rangle$ for corresponding isogeny $\varphi_B: E \to E_B$.
Computes the values of $P_A$ and $Q_A$ under his isogeny $\varphi_B$, namely $\varphi_B(P_A)$ and $\varphi_B(Q_A)$. These values are referred to as auxiliary points.
Publishes $E_B$ and auxiliary points $\varphi_B(P_A)$ and $\varphi_B(Q_A)$.
To obtain a common key, Alice does the following:
Using her private key values $m_A, n_A$ and Bob's auxiliary points $\varphi_B(P_A), \varphi_B(Q_A)$, computes $m_A \cdot \varphi_B(P_A) + n_A \cdot \varphi_B(Q_A)$.
Note that $m_A \cdot \varphi_B(P_A) + n_A \cdot \varphi_B(Q_A) = \varphi_B(m_A \cdot P_A) + \varphi_B(n_A \cdot Q_A) = \varphi_B(m_A \cdot P_A + n_A \cdot Q_A) = \varphi_B(K_A)$.
Hence, it is the image of Alice's kernel generator point in Bob's curve $E_B$.
Using that value as the generator point for the kernel, $\langle \varphi_B(K_A) \rangle$, Alice maps $E_B \to E_{AB}$.
Computes the j-invariant of $E_{AB}$ and uses that as a value of the common key.

Bob does the same, symmetrically:
Using his private key values $m_B, n_B$ and Alice's's auxiliary points $\varphi_A(P_B), \varphi_A(Q_B)$, computes $m_B \cdot \varphi_A(P_B) + n_B \cdot \varphi_A(Q_B)$.
Note that $m_B \cdot \varphi_A(P_B) + n_B \cdot \varphi_A(Q_B) = \varphi_A(m_B \cdot P_B) + \varphi_A(n_B \cdot Q_B) = \varphi_A(m_B \cdot P_B + n_B \cdot Q_B) = \varphi_A(K_B)$.
Hence, it is the image of Bob's kernel generator point in Alice's curve $E_A$.
Using that value as the generator point for the kernel, $\langle \varphi_A(K_B) \rangle$, Bob maps $E_A \to E_{BA}$.
Computes the j-invariant of $E_{BA}$ and uses that as a value of the common key.

The curves $E_{AB}$ and $E_{BA}$ are isomorphic, therefore they have the same j-invariants. For the present purposes, if two elliptic curves are isomorphic, they can be considered to be the same curve.

In some cases, if the integrated encryption scheme and public-key encryption scheme based on supersingular elliptic curve isogenies uses the same primitives as the key exchange scheme, then the value of j-invariant of $E_{AB}$ is hashed and the logical operation 'exclusive-or' (XOR) is applied to encrypt the message.

In some cases, for more incontestable signatures, the constructed prime can consist of three small primes instead of two, and has the form $p = 1_A^{e_A} \cdot 1_M^{e_M} \cdot 1_C^{e_C} \cdot f \pm 1$ where the value A refers to the key of the signer, the value M is for the message, and the value C is used for running the confirmation of disavowal part of the protocol. Note that none of the three values are used for any private information of the verifier. Hence, anyone can be the verifier.

In other cases, 'Strong Designated Verifier Signatures' may be used. Such signatures are signature schemes where only a specific verifier can verify the signature. The signature is generated using private information of the signer and public information of the verifier. The signature is verified using public information of the signer and private information of the verifier.

Authenticated encryption schemes have three major components: key exchange, signature or message authentication code (MAC), and encryption. The encryption part, once all the other parts are performed, is done using a symmetric encryption scheme with key length double the size used for resistance against classical attacks. Key exchange processes are similar to those of the key exchange protocol. For the signature part, since the key exchange part is required, the strong designated verifier signature's idea is integrated into the scheme. The encrpyt-then-sign approach has been shown to be secure against quantum attacks, providing chosen-ciphertext security, one of the highest possible types of security.

Elliptic curve isogenies have a number of intended advantages over other schemes in post-quantum cryptography; including those of lattice-based schemes, code-based schemes, hash-based schemes, and multivariate polynomials-based schemes. For example, elliptic curve isogenies can be applied to building key exchange, authentication, signature, and encryption schemes. While lattice-based cryptography may offer such wide applicability, security parameter selection in lattice-based schemes is a very difficult task, without an exact security level. In contrast, isogeny-based cryptosystems rely directly on the size of the underlying finite field defined by the selected prime number. A further intended advantage is that it may be possible to reuse many already existing libraries for elliptic curves in various programming languages.

The key transmission overhead size of elliptic curve isogeny schemes is also advantageous over other schemes. In general, as a comparison:

ring-LWE schemes require 11600 bits (80-bit security),
ring-LWE schemes require 25000 bits (256-bit security),
NTRU schemes require 5544 bits (128-bit security),
code-based schemes require 52320 bits (128-bit security),
multivariate polynomials schemes require 7672000 bits (128-bit security), and
isogeny-based schemes require 3073 bits (128-bit security).

Further, elliptic curve isogeny schemes offer an advantage of being a clear way to understand a security level of an encryption scheme. Isogeny-based schemes also have the intended advantage of being able to reuse a lot of elliptic curve arithmetic already implemented in conventional elliptic curve encryption schemes.

In the previous scheme, when the initiator picks a basis to generate a (private, public) key pair, it is assumed that this basis pair is $\{P_A, Q_A\}$. In some cases, this can be inconvenient due to the fact that it can become practically impossible to pre-generate the keys and also can limit the freedom of picking basis points by the initiator and responder.

Basis, as referred to herein, includes the points that generate the entire torsion subgroup of the elliptic curve.

In an embodiment of a cryptographic scheme, Applicant has devised an elliptic curve isogeny scheme such that if an initiator and a responder have a choice of selecting one of two basis, they will not select the same basis. Particularly, the same basis will not be selected or else the scheme will fail mathematically.

In this embodiment, the initiator, Alice, can pick any of the bases' points that she wishes and then the responder, Bob, would be able to check which bases' points she has picked and generate his parameters accordingly by picking the other ones available.

Alice, the initiator, does the following:
Picks $Z \in \{A, B\}$ at random or of her own choice.
If $Z=A$, performs key generation, as described above, for Alice. Otherwise (if $Z=B$), Alice performs key generation, as described above, for Bob.

Bob, the responder, having received Alice's public key, which is of the form $E_I, P_1, P_2$ (where $E_I$ is the elliptic curve and $P_1, P_2$ are the auxiliary points), does the following:
Computes $1_A^{e_A} \cdot P_1$. If the result is the identity point ($\infty$), then set $C=A$, else set $C=B$.
If $C=A$, performs key generation, as described above for Alice. Otherwise (if $C=B$), performs key generation, as described above, for Bob Where C is placeholder used here to show that it is unknown until checked.

An intended advantage of this embodiment is encompassed in the action of the responder, Bob. The point $P_1$ from Alice is either of the form $\varphi_A(P_B)$ or $\varphi_B(P_A)$. In the case of $\varphi_B(P_A)$, then $1_A^{e_A} \cdot \varphi_B(P_A) = \varphi_B(1_A^{e_A} \cdot P_A) = \varphi_B(\infty) = \infty$. This means that for Alice $Z=B$, hence Bob must use the A-basis. Otherwise, in case of $\varphi_A(P_B)$, the result of scalar multiplication by $1_A^{e_A}$ will not be $\infty$, and Bob understands that this means that Alice used A-basis, hence he must use B-basis. In this scheme, the number of basis is equivalent to the number of primes, in this case 2. Therefore, if Alice uses A-basis, Bob must use B-basis; and if Alice uses B-basis, Bob must use A-basis.

In some cases, there can be variations to the above checking step. In one such case, instead of $P_1$, any linear combination of $P_1, P_2$ can be taken, i.e., anything of the form $m \cdot P_1 + n \cdot P_2$, such that this linear combination is not equal to infinity ($\infty$). In another case, $1_B^{e_B}$ can be used as a scalar instead of $1_A^{e_A}$. In a further case, one can use both $1_B^{e_B}$ and $1_A^{e_A}$ as a scalar.

An advantage of using both scalars is that it can also check that the parameters provided by Alice are in the right domain by ensuring that they are in the defined torsion subgroups. In this way, in general, users would have the ability to identify which parameters the other user, who is trying to establish the secure connection, is using.

Figure 4:
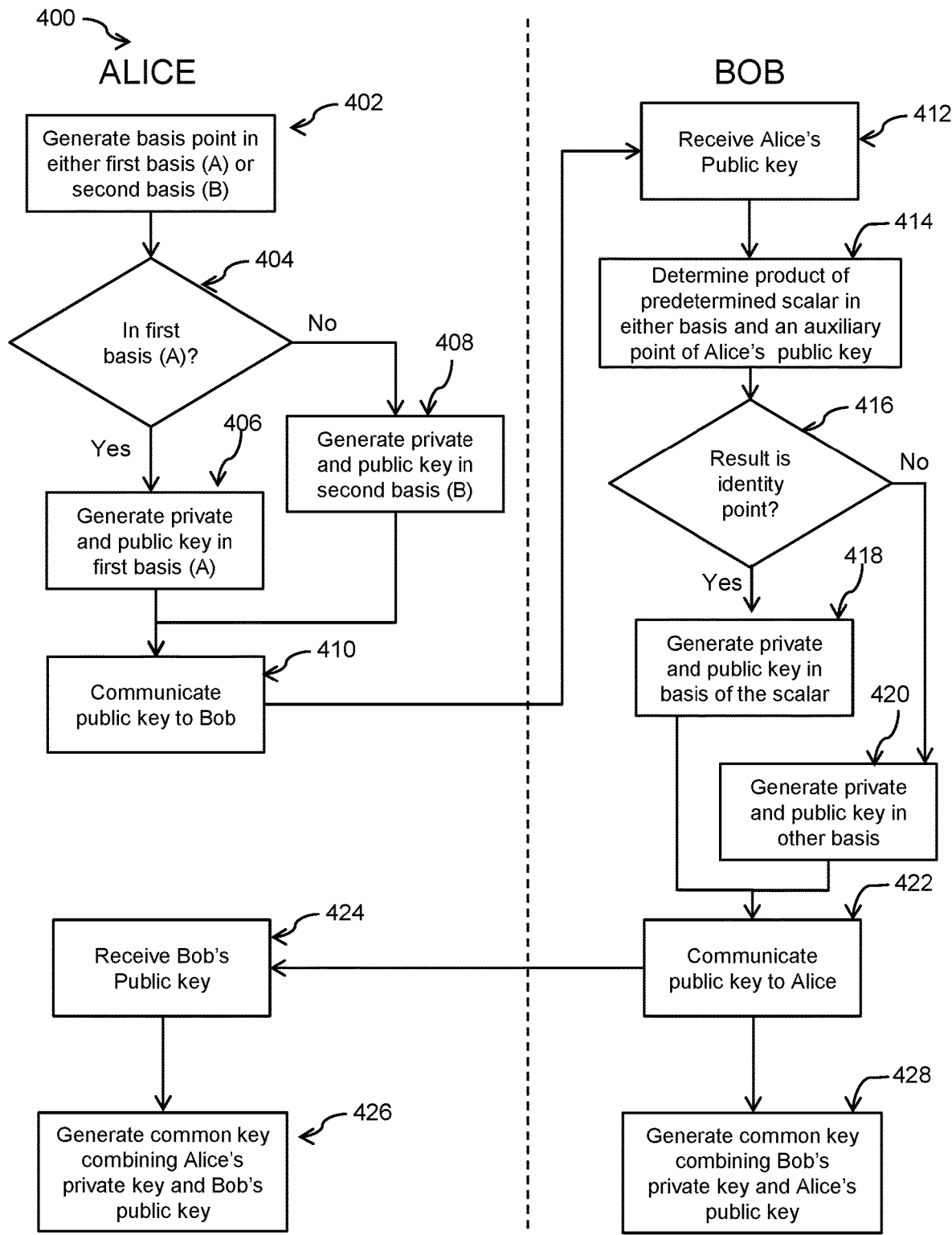
FIG. 4 is a flow chart showing a supersingular elliptic curve cryptographic scheme according to an embodiment.

FIG. 4 is a flow chart showing an example of the above embodiment for an elliptic curve cryptographic scheme 400. In this example, the elliptic curve cryptographic scheme is performed between a first entity "Alice" on a first computing device and a second entity "Bob" on a second computing device.

Alice, at 402, generates a first basis point in either a first basis (A) or a second basis (B). At 404, if the generation was in the first basis (A), then, at 406, Alice generates a first private key with respect to the first basis (A) and a corresponding first public key in the first basis (A), which includes a first elliptic curve and first auxiliary points. If the generation was not in the first basis (A), then, at 408, Alice generates a first private key in the second basis (B) and a corresponding first public key with respect to the second basis (B), which includes a first elliptic curve and first auxiliary points. At 410, Alice communicates the first public key to Bob, who, at 412, receives Alice's first public key.

Bob, at 414, determines the product of a predetermined scalar in either the first basis (A) or the second basis (B) and one of the first auxiliary points. At 416, Bob determines if the product is an identity point. If the product is the identity point, at 418, Bob performs key generation in the basis of the predetermined scalar. If the product is not the identity point, at 420, Bob performs key generation in the other basis. Key generation here includes generating a second private key, and generating a cryptographic corresponding second public key, which includes a second elliptic curve and second auxiliary points. At 422, Bob communicates the second public key to Alice, who, at 424, receives Bob's second public key.

Alice, at 426, generates a common key by combining the first private key and Bob's second public key. Bob, at 428, generates a common key by combining the second private key and Alice's first public key.

The operations performed for key generation by the initiator, Alice, and the responder, Bob, differs in the above embodiments. In some specific circumstances, this may be inconvenient if the key generation is required to be identical for both entities, the initiator and responder.

In a further embodiment of a supersingular isogeny-based cryptographic scheme, there is provided a protocol in which both entities perform the same operations for both key generation and common key establishment.

In this embodiment, each entity generates their own (private, public) key pair using both A and B basis. Each entity matches the key pair with opposite parameters of the other entity. The entity can then compute two common keys. Using the common keys, the entity can either compute one key from it or use the common keys for two different purposes.

For key generation, each entity does the following:
Randomly selects $m_A, n_A \in Z_{l_A}^{e_A}$ and $m_B, n_B \in Z_{l_B}^{e_B}$.
Computes $K_A = m_A P_A + n_A Q_A$.
Computes $K_B = m_B P_B + n_B Q_B$.
Obtains $E_A$ using the kernel $\langle K_A \rangle$ for corresponding isogeny $\varphi_A: E \to E_A$.
Obtains $E_B$ using the kernel $\langle K_B \rangle$ for corresponding isogeny $\varphi_B: E \to E_B$.
Computes the values of $P_B$ and $Q_B$ under his isogeny $\varphi_A$, namely $\varphi_A(P_B)$ and $\varphi_A(Q_B)$.

Computes the values of $P_A$ and $Q_A$ under his isogeny $\varphi_B$, namely $\varphi_B(P_A)$ and $\varphi_B(Q_A)$.

Publishes $E_A, E_B$ and auxiliary points $\varphi_A(P_B), \varphi_A(Q_B), \varphi_B(P_A)$ and $\varphi_B(Q_A)$.

Thus, the private key is: $\{m_A, n_A, m_B, n_B\}$.

Further, the public key is: $\{E_A, E_B, \varphi_A(P_B), \varphi_A(Q_B), \varphi_B(P_A), \varphi_B(Q_A)\}$.

To obtain the common key, once the entity has the public value of the other entity, $\{E_1, E_2, P_{00}, P_{01}, P_{10}, P_{11}\}$ (corresponding respectively to the public key values $\{E_A, E_B, \varphi_A(P_B), \varphi_A(Q_B), \varphi_B(P_A), \varphi_B(Q_A)\}$ of the other entity), with whom he/she wished to generate common key, he/she does the following:

Using his/her private key values $m_A, n_A$ and the other entity's auxiliary points $P_{10}, P_{11}$, computes $K_{A2} = m_A \cdot P_{10} + n_A \cdot P_{11}$.

Using his/her private key values $m_B, n_B$ and the other entity's auxiliary points $P_{00}, P_{01}$, computes $K_{B1} = m_B \cdot P_{00} + n_B \cdot P_{01}$.

Using $K_{A2}$ as the generator point for the kernel, he/she maps $E_2 \rightarrow E_{A2}$.

Using $K_{B1}$ as the generator point for the kernel, he/she maps $E_1 \rightarrow E_{B1}$.

Computes the j-invariants of $E_{A2}$ and $E_{B1}$, and uses that as a value of the common key.

Figure 5:
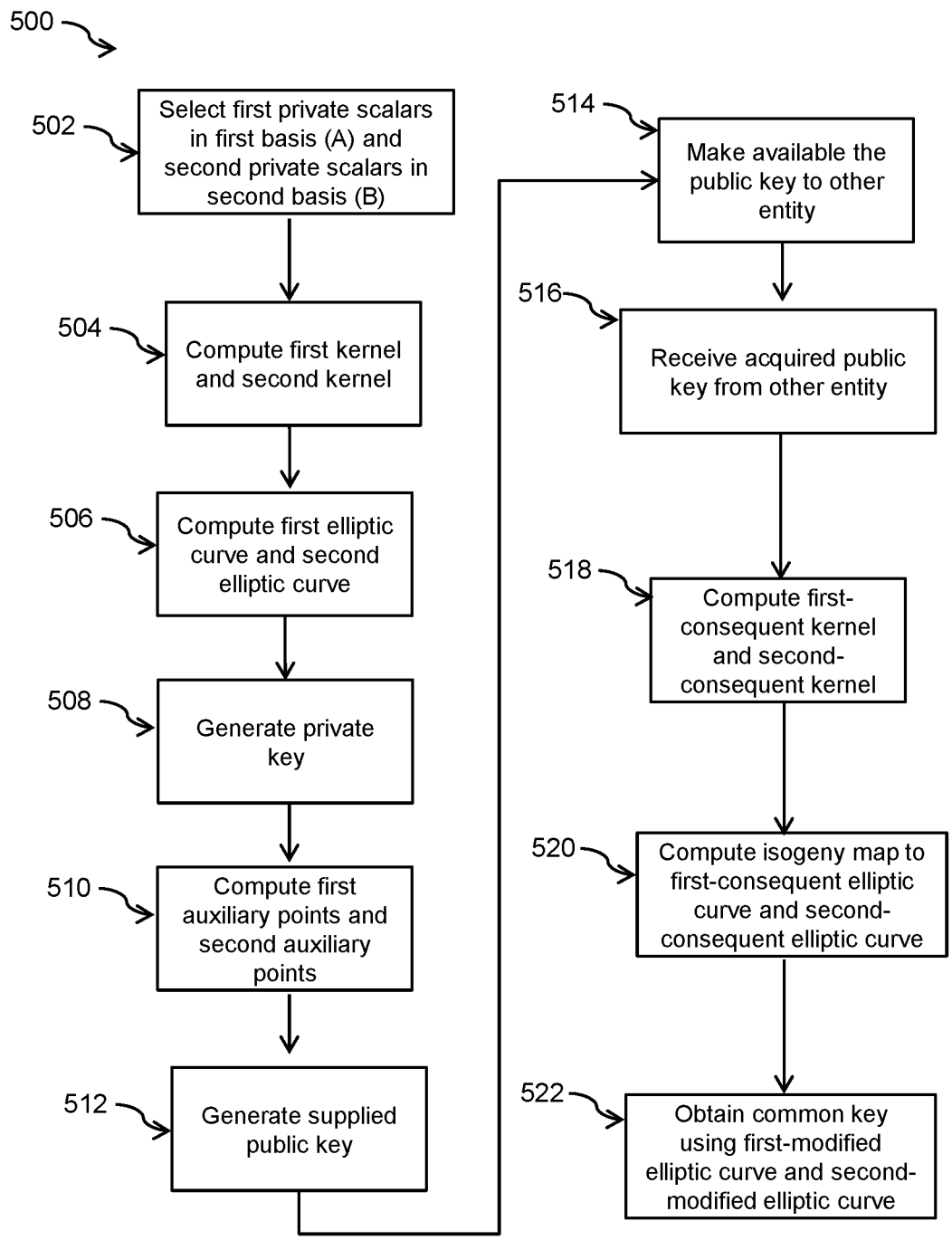
FIG. 5 is a flow chart showing a supersingular elliptic curve cryptographic scheme according to another embodiment.

FIG. 5 is a flow chart showing an example of the above embodiment for an elliptic curve cryptographic scheme 500. In this example, the elliptic curve cryptographic scheme is performed symmetrically between two entities on two separate computing devices communicating over a data communication system.

At 502, the entity randomly selects first private scalars in a first basis (A) and second private scalars in a second basis (B).

At 504, the entity computes a first kernel in the first basis (A), using the first private scalars, corresponding to a first isogeny in the first basis (A), and a second kernel in the second basis (B), using the second private scalars, corresponding to a second isogeny in the second basis (B).

At 506, the entity computes a first elliptic curve, representing a first image of an originating elliptic curve under the first isogeny, using the first kernel and a second elliptic curve, representing a second image of the originating elliptic curve under the second isogeny, using the second kernel.

At 508, a private key is generated and includes the first private scalars and the second private scalars.

At 510, the entity computes first auxiliary points using the first isogeny and second auxiliary points using the second isogeny.

At 512, a supplied public key is generated and includes the first elliptic curve, the second elliptic curve, the first auxiliary points and the second auxiliary points.

At 514, the entity makes available the supplied public key to the other entity, through publishing or communicating the supplied public key to the other entity.

At 516, the entity receives from the other entity a corresponding acquired public key created by the other entity, as the other entity has likewise completed 502 to 508. The acquired public key includes a first-acquired elliptic curve, a second-acquired elliptic curve, first-acquired auxiliary points and second-acquired auxiliary points. In some cases, the acquired public key can be received from the other entity via retrieving, such as looking up, the acquired public key from another entity or resource.

In order to generate a common key, the entity does the following:

At 518, the entity computes a first-consequent kernel using the first private scalars and the second-acquired auxiliary points, and the entity computes a second-consequent kernel using the second private scalars and the first-acquired auxiliary points.

At 520, using the first-consequent kernel, the entity computes an isogeny map to a first-consequent elliptic curve from the first-acquired elliptic curve, and, using the second-consequent kernel, the entity computes an isogeny map to a second-consequent elliptic curve from the second-acquired elliptic curve.

At 522, the entity obtains the common key by computing the j-invariants of the first-consequent elliptic curve and the second-consequent elliptic curve.

Having a common key as described above allows the key to be static. A static key can have the advantage of being less computationally strenuous in further data exchanges due to not having to recompute a new key. Further, using a static key can also have the advantage of being certifiable.

In this embodiment, the approach is similar to Diffie-Hellman, and as such, can have the advantage of using it as a plug-in (or drop-in) replacement for Diffie-Hellman key exchange. In this way, this scheme has the added usability over other post-quantum cryptographic schemes because it requires less effort to begin using it with current computer infrastructures and existing application program interfaces. A further intended advantage is that the application program interface does not have to make a distinction between the initiator and the receiver, meaning there is less complications to run the scheme. A yet further intended advantage is that the application program interface (API) for key generation for the initiator and the responder would be the same, increasing efficiency and saving costs.

In this embodiment, it is assumed that the public key, and namely the auxiliary points, are in the given order. In a further case where such requirement is not imposed, or where an entity wishes to verify the correctness of the domain parameters, then the common key generation further includes the entity checking which domain each point belongs, as described herein. The entity can then match the points with the opposite domain parameters to generate the common key.

Although the invention has been described with reference to certain specific embodiments, various other aspects, advantages and modifications thereof will be apparent to those skilled in the art without departing from the spirit and scope of the invention as outlined in the claims appended hereto. The entire disclosures of all references recited above are incorporated herein by reference.

The invention claimed is:

1. An elliptic curve cryptographic scheme performed between a first entity on a first computing device and a second entity on a second computing device communicating over a data communication system, the cryptographic scheme comprising:
   performing, by the first entity:
      selecting a first selected basis being either a first basis or a second basis;
      performing first key generation with respect to the first selected basis to generate a first private key and a first public key; and
      communicating the first public key to the second entity;
   performing, by the second entity:
      determining if a linear combination, in a second selected basis being either the first basis or the second basis, is an identity point;

performing second key generation with respect to the first basis if the scalar multiplication product is the identity point, otherwise performing second key generation with respect to the second basis, the second key generation generating a second private key and a second public key; and communicating a second public key to the first entity;

performing, by the first entity:
generating a common key by combining the first private key and the second public key; and performing, by the second entity:
generating a common key by combining the second private key and the first public key.

2. The elliptic curve cryptographic scheme of claim 1, wherein first key generation comprises:
generating a first private key; and
generating a cryptographic corresponding first public key comprising a first elliptic curve and first auxiliary points; and
wherein second key generation comprises:
generating a second private key; and
generating a cryptographic corresponding second public key comprising a second elliptic curve and second auxiliary points.

3. The elliptic curve cryptographic scheme of claim 2, wherein determining the linear combination comprises determining a scalar multiplication product of a predetermined scalar in the second selected basis and one of the first auxiliary points.

4. The elliptic curve cryptographic scheme of claim 2, wherein determining the linear combination comprises determining a scalar multiplication product of a predetermined scalar in the first selected basis and one of the first auxiliary points.

5. The elliptic curve cryptographic scheme of claim 2, wherein determining the linear combination comprises determining a scalar multiplication product of a predetermined scalar in the first selected basis, a predetermined scalar in the second selected basis, and one of the first auxiliary points.

6. The elliptic curve cryptographic scheme of claim 5, further comprising determining whether the values of the first public key are in the correct domain by determining that such values are in defined torsion subgroups.

7. The elliptic curve cryptographic scheme of claim 2, wherein determining the linear combination comprises determining a sum of a first private scalar multiplied by the first auxiliary point and a second private scalar multiplied by the second auxiliary point.

8. A cryptographic correspondent device comprising a processor and a memory, the cryptographic correspondent device in communication with an other cryptographic correspondent device over a data communication system, the memory having stored thereon computer instructions which when executed by the processor cause the processor to implement a elliptic curve cryptographic scheme comprising:

receiving, from the other cryptographic correspondent device, a first public key, the other cryptographic correspondent device having selected a first selected basis being either a first basis or a second basis, and the other cryptographic correspondent device having performed first key generation with respect to the first selected basis to generate a first private key and the first public key;

determining if a linear combination, in a second selected basis being either the first basis or the second basis, is an identity point;

performing second key generation with respect to the first basis if the scalar multiplication product is the identity point, otherwise performing second key generation with respect to the second basis, the second key generation generating a second private key and a second public key;

communicating the second public key to the other cryptographic correspondent device; and generating a common key by combining the second private key and the first public key.

9. The cryptographic correspondent device of claim 8, wherein first key generation comprises:
generating a first private key; and
generating a cryptographic corresponding first public key comprising a first elliptic curve and first auxiliary points; and
wherein second key generation comprises:
generating a second private key; and
generating a cryptographic corresponding second public key comprising a second elliptic curve and second auxiliary points.

10. The cryptographic correspondent device of claim 9, wherein determining the linear combination comprises determining a scalar multiplication product of a predetermined scalar in the second selected basis and one of the first auxiliary points.

11. The cryptographic correspondent device of claim 9, wherein determining the linear combination comprises determining a scalar multiplication product of a predetermined scalar in the first selected basis and one of the first auxiliary points.

12. The cryptographic correspondent device of claim 9, wherein determining the linear combination comprises determining a scalar multiplication product of a predetermined scalar in the first selected basis, a predetermined scalar in the second selected basis, and one of the first auxiliary points.

13. The cryptographic correspondent device of claim 12, further comprising determining whether the values of the first public key are in the correct domain by determining that such values are in defined torsion subgroups.

14. The cryptographic correspondent device of claim 9, wherein determining the linear combination comprises determining a sum of a first private scalar multiplied by the first auxiliary point and a second private scalar multiplied by the second auxiliary point.

\* \* \* \* \*